Feb. 16, 1971 P. L. RICHMAN 3,564,389

AC TO DC CONVERTER

Filed May 16, 1969 2 Sheets-Sheet 1

PETER L. RICHMAN
INVENTOR.

BY Robert J. Schiller
ATTORNEY.

PETER L. RICHMAN
INVENTOR.

BY Robert J. Schiller
ATTORNEY.

United States Patent Office 3,564,389

Patented Feb. 16, 1971

3,564,389

AC TO DC CONVERTER

Peter L. Richman, 22 Barberry Road, Lexington, Mass. 40503

Filed May 16, 1969, Ser. No. 825,344

Int. Cl. H02m 7/00

U.S. Cl. 321—18 21 Claims

ABSTRACT OF THE DISCLOSURE

This is a system for converting a time-varying signal into a substantially steady-state output typically the RMS value of the original signal. The system includes a circuit for providing the absolute value of the input signal, and a gain circuit which provides a gain directly proportional to the absolute value and inversely proportional to the RMS value. The output of the latter is then averaged to provide RMS. Preferably, the gain circuit operates by clipping proportioned or scaled absolute signals at a plurality of levels determined as proportions of the steady-state output, and the resulting clipped values are summed together.

This invention relates to conversion of the magnitude of a time-varying signal into a proportional substantially steady-state value, and particularly to a conversion system which, for either periodic or aperiodic inputs, can yield an output which is proportional to the input.

It has been disclosed in copending application Ser. No. 743,442 that one can convert a complex wave into D.C. with reduced response to selected harmonic distortion components by altering the gain of the conversion system between predetermined phase angles with respect to the fundamental of the wave. For example, an input signal can be introduced into two parallel converters, one being an average-sensing system, the other a peak-average sensing device. The outputs of the converters are scaled and summed. If the peak-average device has been set to perform averaging of the absolute value of the input waveform amplitude above a clipping level between 60° and 120° (and 240° and 300°) with respect to the fundamental, suitable scaling and summation of the two conversions will yield a D.C. level approximately independent of the value of all even and any two preselected odd harmonic components that may have accompanied the fundamental. Alternatively, one may provide the requisite gain control using a gating system whereby the input wave is gated for example to a conventional A.C.–D.C. converter by switches operated by reference gating signals. These systems are useful for conferring upon the conversion insensitivity to all even and any two preselected odd harmonics, e.g. third and fifth. The systems, however, are nevertheless subject to errors due to the presence of other odd harmonics in the input.

It is a principal object of the present invention to provide means for converting a time-varying signal $e_1(t)$ into a substantially steady-state value $e_0$ which is an arbitrary function of $e_1(t)$ by a system which constructs an intermediate function within the conversion process. This intermediate function can be constructed as a continuous function or a piecewise linear approximation. The signal $e_1(t)$ need not be periodic and can even include a D.C. component.

Another object of the present invention is to provide such a means for converting, wherein the signal $e_i(t)$ is periodic, such that $e_0$ exhibits a high degree of insensitivity to a large number of input wave components which are odd-harmonically related to the fundamental component of the wave of $e_1(t)$, whilst retaining prior art insensitivity to all even-harmonically related components as is characteristic of average-sening converters.

Another object of the present invention is to provide a system for converting a time varying signal which can be a sinusoid, a square wave, a triangular wave, noise or the like, into a steady-state value very closely approximating the true RMS value of the input signal.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the persent invention, reference should be had to the following detailed description taken in connection with the accompanying drawings wherein:

Broadly, the present invention is a device for generating from a time-varying input signal, which may have a D.C. or steady-state component, a substantially steady-state output functionally related to the input signal. In effecting this, one form of the device generates the functional relation by an approximation method. Where the input signal is a complex periodic wave, the device can be constructed so that the output is a substantially steady-state value wherein the effect of a large number of the odd-harmonically related components of the wave is minimized drastically while the conversion retains the high degree of even-harmonic insensitivity ordinarily associated with prior art average-converters. The device can also be constructed such that it will provide an output which is substantially the RMS value of the input although the latter can be a substantially rectangular or other periodic waveform or even be as aperidoic as noise and may contain a D.C. component.

Figure 1:
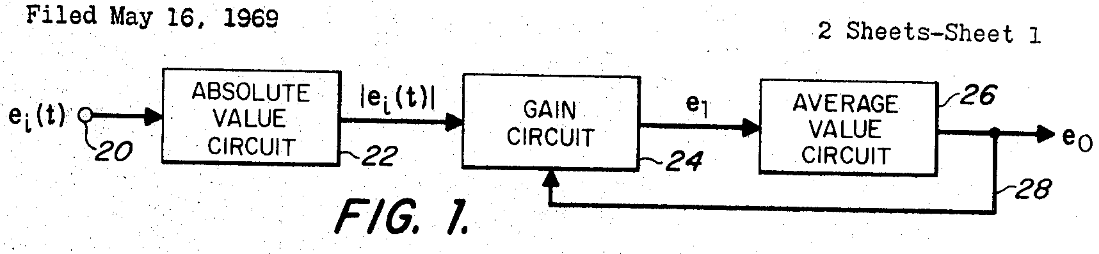
FIG. 1 is a block diagram illustrating the general form of the persent invention.

The foregoing can be better understood by reference to FIG. 1 wherein the invention is shown simply to comprise an input terminal 20 at which some time-varying signal $e_1(t)$ can be applied. Terminal 20 connects to the input of absoluting circuit 22 which provides an output $|e_1(t)|$. Thus, regardless of the polarity of $e_1(t)$, the output of circuit 22 is always of one sign. Such circuits, typically rectifier circuits or the like, are well-known in the art and need no further description here. The output of circuit 22 is connected to an input of gain circuit 24, and the output of the latter is connected to averaging circuit 26. The latter typically merely provides an output signal $e_0$ which is a time average of signals at its input and typically is a low-pass filter or the like, well known in the art. A feedback path 28 is provided for connecting the output of circuit 26 to an input of gain circuit 24.

If gain circuit 24 is constructed and connected so that it provides a gain directly proportional to the absolute value $|e_i(t)|$ and inversely proportional to the valve $e_0$, then the gain G of circuit 24 can be defined as:

$$G=K\frac{|e_i(t)|}{e_0} \qquad (1)$$

Where K is an arbitrary constant, then the output $e_2$ of circuit 24 will be:

(2) $$e_2=|e_i(t)|G$$

or (3) $$e_2=\frac{ke_i^2(t)}{e_0}$$

Circuit 26 provides the average or $\overline{e_2}$, thus:

(4) $$\overline{e_2}=\frac{\overline{ke_i^2(t)}}{e_0}=e_0$$

Because $e_0$ is by definition a steady-state value, then $\overline{e_0}=e_0$, hence:

(5) $$k\overline{e_i^2(t)}=e_0^2$$

If now we solve Equation 5 for $e_0$, then (6) $$e_0=\sqrt{k}\sqrt{\overline{e_i^2(t)}}$$

Figure 6:
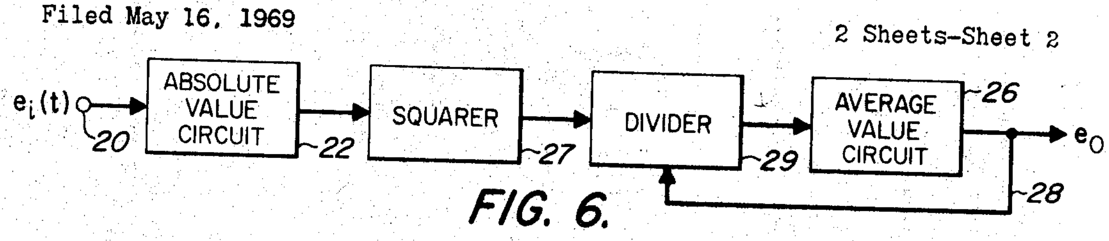
FIG. 6 is a block diagram showing a simple implementation of the principles of the present invention.

Equation 6 indicates that $e_0$ is the root mean square (RMS) value of $e_i(t)$. To achieve this, it is necessary to provide circuit 24 with the capability of performing the function G. One form of the invention therefore provides means (for example, in the form of known transconductance or other analog type multipliers currently available from many semiconductor and module manufacturers, or digital or hybrid multipliers and dividers available from computer component manufacturers) for carrying out the function G as a substantially exact mathematical model as distinguished from proceeding by a piecewise linear approximation of the function. Thus, as shown in FIG. 6, wherein like numerals denote like parts and gain circuit 24 of FIG. 1 now appears as squarer 27 having an input fed from absoluting circuit 22. The output of squarer 27 is in turn fed to divider 29 which is also connected to feedback path 28. Thus, squarer 27 performs the squaring of the input signal required by Equation 3, typically by use of a half-effect or transconductance multiplier. This squared value is then divided by $e_0$ by divider 29 which typically can be a transconductance multiplier used in a known manner in the feedback path of an operational amplifier.

A preferred embodiment of the present invention provides means for approximating the function G; and as will be seen, this provides the invention with great flexibility in its applications. By virtue of "approximating" G, the invention can advantageously convert an input signal $e_i(t)$ whether the latter is in either periodic or aperiodic form. The function G, for purposes of this invention should be understood to include both "gain" and "attenuation."

Figure 2:
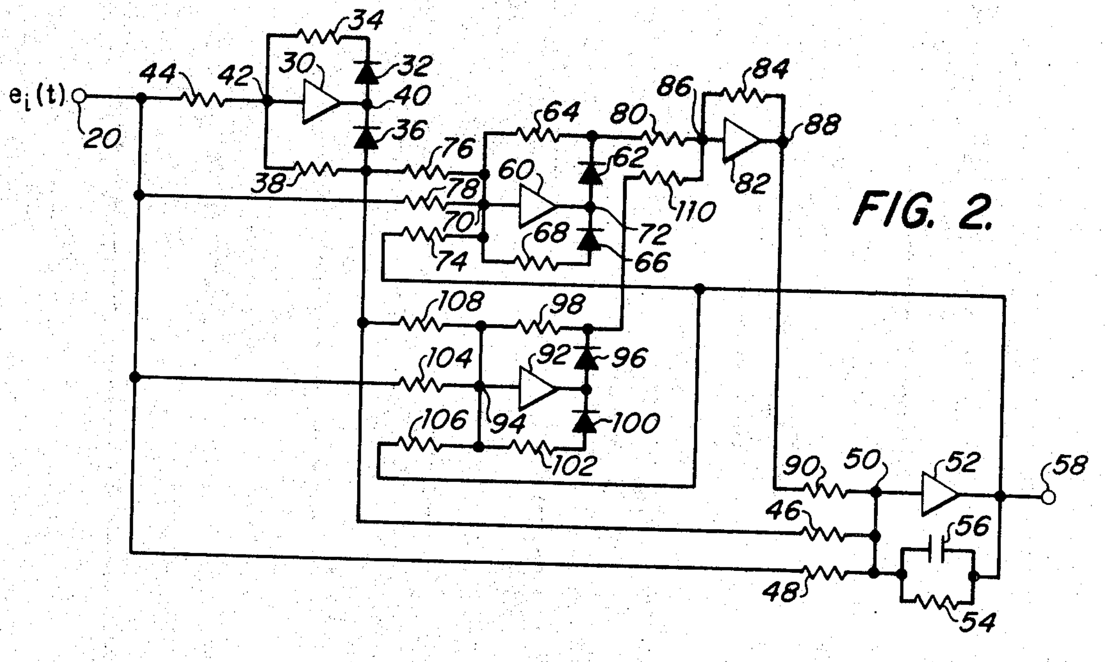
FIG. 2 is a schematic circuit diagram of one specific embodiment of the present invention.
Figure 5:
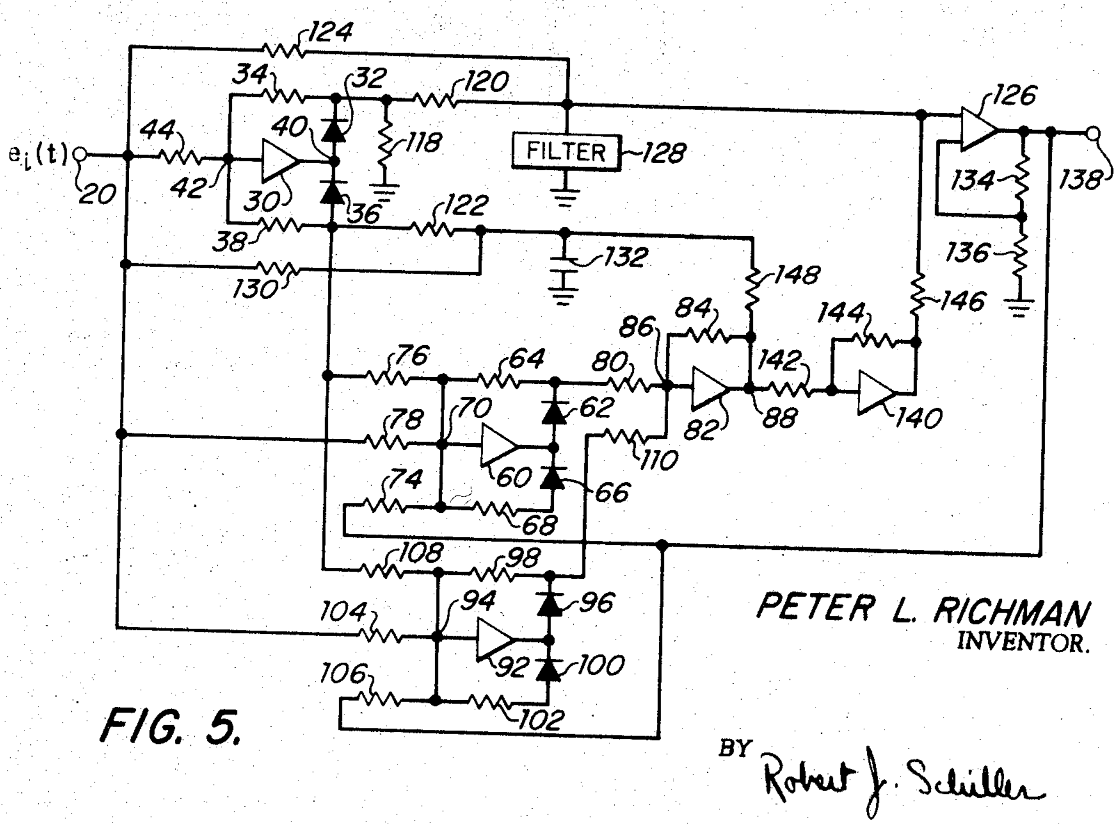
FIG. 5 is schematic circuit diagram of yet another embodiment of the present invention.

The present invention can be implemented in a number of other ways one of which is shown in FIG. 2 wherein like numerals denote like parts. The latter includes input terminal 20 at which the input signal $e_i(t)$ is to be applied. This signal is first half-wave rectified in first operational rectifier comprising inverting amplifier 30 having a first feedback path through series diode 32 and resistance 34 and a second feedback path through series diode 36 and resistance 38, both connected between output terminal 40 and summing junction 42 at the amplifier input. Input resistor 44 is connected between terminal 20 and junction 42. Diodes 32 and 36 are connected anode to cathode so that the feedback paths each can conduct currents of a specific polarity, one negative, the other positive. For a more complete description of precision rectifiers employing operational amplifiers, see the text Electronic Analog and Hybrid Computers, Korn and Korn, McGraw-Hill Book Company, 1964, chapter 9, pp. 344–345, 359–360.

The half-wave precision rectified output signal $e_r$ taken from the junction of diode 36 and resistor 38, is summed with $e_i(t)$ via respective input resistors 46 and 48 at the summing junction 50 of operational summer-filter. The latter, exemplary of a low-pass filter, comprises inverting amplifier 52 having a paralleled resistor 54 and capacitor 52 in a feedback path between its output terminal 58 and junction 50. For a fuller description of operational summer-filter amplifiers, reference is here made to the text Electronic Analog and Hybrid Computers, supra, Section 1–14, pp. 21–27. It will be apparent that if the overall gain of the operational rectifier formed by amplifier 30 and its associated components is unity (as would be the case by setting the values of resistors 44 and 38 equal to one another), and the ohmic values of resistors 48 and 46 are in 2:1 ratio, then the summation of $e_i(t)$ and $e_r$ provides effectively a full-wave rectification; thus, in the absence of other inputs to amplifier 52, the output signal $e_0$ at terminal 58 would be a DC potential proportional to the input $e_i(t)$ in a conventional average sense.

A first auxiliary operational rectifier, similar to the first rectifier described, comprises high gain inverting amplifier 60 having two oppositely poled, conductive feedback loops, respectively comprising diode 62 and resistor 64 and diode 66 and resistor 68, connecting input summing junction 70 with output terminal 72. Input resistors 74, 76 and 78 respectively connect junction 70 with terminal 58, with the junction of diode 36 and resistor 38, and with input terminal 20.

It is important to note that resistor 74 provides a feedback connection so that the output DC $e_0$ is fed back to this first auxiliary rectifier.

The junction of diode 62 and resistor 64 is connected through input resistor 80 to an operational inverter comprising inverting amplifier 82 having a feedback loop including resistor 84 between its input summing junction 86 and its output terminal 88. The latter is connected through another input resistor 90 to summing junction 50.

There is also provided a second auxiliary operational rectifier which comprises inverting amplifier 92 having the usual two oppositely poled, conductive feedback loops between its output terminal and its input summing junction 94. These feedback loops respectively comprise series diode 96 and resistor 98, and series diode 100 and resistor 102. Summing junction 94 is connected via input resistors 104, 106 and 108 respectively to terminal 20, terminal 58 and to the junction of diode 36 and resistor 38. The junction of diode 96 and resistor 98 is connected through resistor 110 to summing junction 86.

Figure 3:
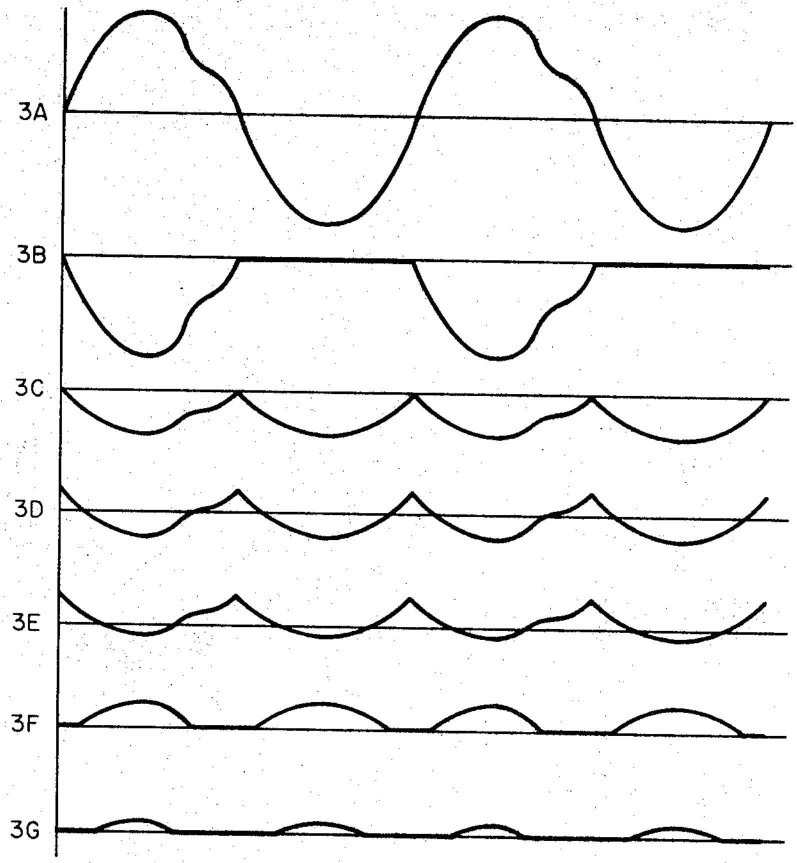
FIG. 3 is a graphical representation of exemplary complex waveforms occuring in operation of the embodiment of FIG. 2.

In operation a signal $e_i(t)$, such as shown in FIG. 3A, applied at terminal 20 will be half-wave rectified and inverted by the operational rectifier comprising amplifier 30 yielding at the junction of diode 36 and resistor 38, a signal such as is shown in FIG. 3B. The combined wave-forms are applied to summing junction 70 through input resistors 76 and 78. Assuming that the overall gain of the first operational rectifier is unity (as would be the case where the values of resistors 44 and 38 are the same) and that resistor 78 is twice the value of of resistor 76, the signal applied through the two latter resistors is a true full-wave rectification or the absolute value signal $|e_i(t)|$ as shown in FIG 3C. Hence the first operational rectifier acts as absoluting circuit 22 of FIG. 1.

The equivalent of gain circuit 24 of FIG. 1 is functionally the combination of the first and second auxiliary operational rectifiers and its associated inverter amplifier. It will be appreciated that the current flowing through junction 70 includes a DC component derived through resistor 74 from terminal 58. The value of resistor 74 provides a selected scaling factor, and the positive potential from resistor 74 biases the full-wave, negative rectified potential of FIG. 3C in the positive direction. This waveform, shown in FIG. 3D is now bipolar, hence it is again rectified or clipped by the operational rectifier comprising amplifier 60. The resulting inverted rectified signal shown in FIG. 3F is taken from the positive conducting feedback loop around amplifier 60 then fed to junction 86 through resistor 80.

The second auxiliary rectifier comprising amplifier 92 is connected to the same three voltage sources as the first rectifier, namely, through resistor 108 to the junction of diode 36 and resistor 38, through resistor 104 to terminal 20, and through resistor 106 to terminal 58. Hence, one may select the values of resistors 104 and 108 (keeping them also in a 2:1 value ratio) to be different than or the same as those of resistors 78 and 76 either changing or retaining the amplitude of the sum of their wave-forms which are shown for example in FIG. 3E biased positively by the output voltage from resistor 106 which in the waveform shown is made more positive than the bias provided by resistor 74. This difference in the scaling resistors causes a smaller proportion of the waveform of FIG. 3E to be negative than that of FIG. 3D. Hence, the inverted rectified signal taken from the positive conducting feedback loop around amplifier 92 as shown as FIG. 3G and fed to junction 86, is more clipped than the waveform of FIG. 3F.

These two waveforms, 3F and 3G, are then summed and inverted by amplifier 82 and fed to summing junction 50 through scaling resistor 90. A full-wave rectified version of $e_i(t)$ or $|e_i(t)|$, such as FIG. 3C, is also fed to junction 50 due to the respective connections of resistors 46 and 48. The waveform of $|e_i(t)|$ shown in FIG. 3C is of negative polarity even though being an absolute value, for convenience in establishing a final output value of positive polarity at terminal 58. Amplifier 52 serves to integrate or provide the average of the sum of all of these signals to yield a steady-state value of potential at terminal 58 which approximates the RMS value of $e_i(t)$. Feedback of this RMS-proportional signal of course occurs through resistors 106 and 74.

The understanding of the operation of the invention can be advantageously described in connection with the diagram of FIG. 4 wherein the output signal $|e_i(t)|$ from the first rectifier or absoluting circuit 22 has been shown simply as a sinusoid. Now consider that the peak value of the sinusoid is defined as $e_p$ that the bias fed back to the first auxiliary operational rectifier established the clipping level $k_1e_p$, and that the bias fed back to the second auxiliary operational rectifier established a second clipping level $k_2e_p$. I can also define the total area under the entire half-wave of the sinusoid as $A_0$, $A_1$ as the area of the sinusoid half-cycle above $k_1e_p$ and $A_2$ as the area of the sinusoid half-cycle above $k_2e_p$.

The input signal may be defined then as $$e_i(t)=e_p \sin \varphi+e_n \sin n\varphi \tag{7}$$

where $e_p$ and $e_n$ are the peak amplitudes of the fundamental and the $n^{th}$ harmonic respectively, $n$ being odd.

The area $A_1$ can then be computed by integrating the area above the clipping level $k_1e_p$. As indicated on FIG. 4, the intersections of the clipping level $k_1e_p$ with the sinusoid occur at the phase angles $\varphi_1$ and $(\pi-\varphi_1)$.

The area $A_1$ is then:

$$A_1=\int_{\varphi_1}^{\pi-\varphi_1} (e_p \sin \varphi+e_n \sin n\varphi)d\varphi-k_1e_p(\pi-2\varphi) \tag{8}$$

or $$A_1=2e_p \cos \varphi_1-k_1e_p (\pi-2\varphi_1)+(2e_n/n) \cos \varphi_1 \tag{9}$$

$A_0$ is the integral of Equation 7, or $$A_0=\int_0^{\pi} (e_p \sin \varphi+e_n \sin n\varphi)d\varphi \tag{10}$$

or $$A_0=2e_p+(2e_n/n) \tag{11}$$

Computing the area $A_2$ as for $A_1$ but using $k_2$ and $\varphi_2$, $$A_2=2e_p \cos \varphi_2-k_2e_p(\pi-2\varphi_2)+(2e_n/n) \cos \varphi_2 \tag{12}$$

Summing the areas $A_0$, $A_1$ and $A_2$ with corresponding scale factors one obtains a total $A_t$, $$A_t=\alpha(A_0+\beta_1A_1+\beta_2A_2) \tag{13}$$

Substituting from Equations 12, 11 and 9, $$A_t=\alpha\{2e_p[1+\beta_1 \cos \varphi_1-(\beta_1k_1/2)(\pi-2\varphi_1)+\beta_2 \cos \varphi_2-(\beta_2k_2/2)(\pi-2\varphi_2)]+(2e_n/n)[1+\beta_1 \cos n\varphi_1+\beta_2 \cos n\varphi_2]\} \tag{14}$$

For $A_t$ to be insensitive to the presence of the $n^{th}$ harmonic in $e_i(t)$, the term in Equation 14 including $e_n$ must be zero. Choice of $\beta_1=\sqrt{3}$, $\beta_2=1$, $\varphi_1=\pi/6$ and $\varphi_2=\pi/3$ yields this result for $n=3$, 5, 7 and 9 simultaneously. With these values for $\varphi_1$ and $\varphi_2$, the multiples (which term includes submultiples) $k_1$ and $k_2$ respectively are then given by sin $\pi/6$ and sin $\pi/3$ (or 1/2 and $\sqrt{3}/2$ respectively). The values $k_1$ and $k_2$ are expressed as related to peak values but can also be expressed as $k_1'$ and $k_2'$ related to the output signal $e_0$ simply by multiplying $k_1$ and $k_2$ by $\sqrt{2}$. Thus, referred to $e_0$, $k_1'=\sqrt{2}/2$ and $k_2'=\sqrt{6}/2$. It will be apparent then to minimize the effects of the lowest four odd harmonics in $e_i(t)$, one must select the values of the scaling resistors 74 and 106 to provide feedback bias which will clip the input substantially at the levels $k_1e_p$ and $k_2e_p$ where $k_1$ and $k_2$ are valued as hereinbefore noted. The output can readily be proportioned to the RMS value of the input (for example, equality of the output potential with the RMS value of the input requires selection of $\alpha=0.6099$).

One can introduce yet more clipping levels by adding respective additional auxiliary operational rectifiers operating on inputs from the same sources as the other auxiliary rectifiers but at other clipping levels and summing their outputs in inverter 82. For example, introduction of another or third clipping level $k_3e_p$ eliminates the effect of the first six odd harmonics (from the third to the thirteenth) when $\varphi_1=\pi/8$, $\varphi_2=\pi/4$, $\varphi_3=3\pi/8$, implying $k_1=0.3827$, $k_2=0.707$ and $k_3=0.9239$, with $\beta_1=1.848$, $\beta_2=1.414$ and $\beta_3=0.763$. Thus, referred to the output, $k_1'$ is then $0.3827\sqrt{2}$, $k_2'$ is $0.707\sqrt{2}$ or unity and $k_3'$ is $0.9239\sqrt{2}$.

It should be noted that the area $A_t$ is formed by a series approximation (Equation 13). The function G defined by Equation 1 is, for any given value of $e_i(t)$, dependent on the value of $e_0$ which in turn depends on $A_t$. The more terms used in the approximation given by equation such as 13 and thus the more clipping levels generated, the more closely will the value of $e_0$ approach the mathematically exact desired relationship, such as the RMS value. It will also be appreciated that as earlier noted, the function shown as Equation 3 may be generated by explicit multiplication and division where adequately accurate multipliers and dividers are available.

Figure 4:
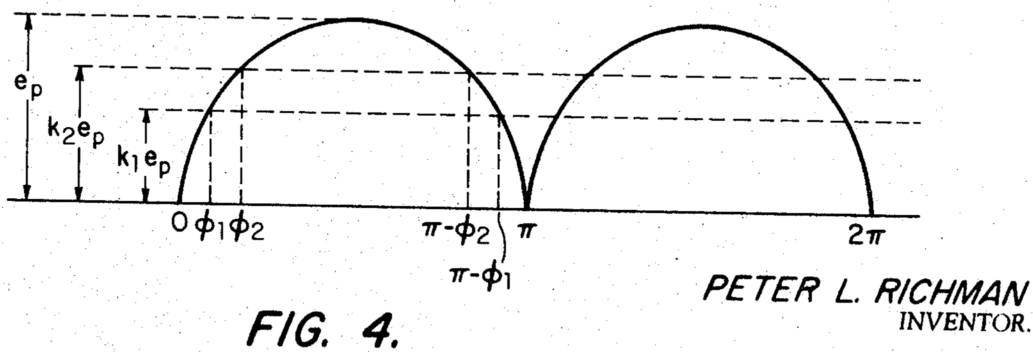
FIG. 4 is a graphical representation of clipping levels provided by the embodiment of FIG. 2.

The present invention can take other specific forms as shown in FIG. 4 wherein, like numerals denoting like parts, the input operational rectifier (comprising amplifier 30, input resistor 44 and feedback resistors 34 and 38 respectively associated with diodes 32 and 36), is connected to input terminal 20. The diode-resistor junction of one feedback path is connected to one side of resistor 120 and the diode-resistor of the other feedback path is connected to one side of resistor 122. The other side of resistor 120 is connected through resistor 124 to terminal 20 and also to both the non-inverting input of buffer amplifier 126 to one terminal of active filter 128. The other terminal of filter 128 is connected to ground. Similarly, the other side of resistor 122 is connected through resistor 130 to terminal 20, and also through capacitor 132 to ground. The output of buffer amplifier 126 is connected through feedback resistor 134 to the inverting input of the amplifier which is also connected through resistor 136 to ground. The ratio of the two resistors 134, 136, of course, establishes the overall amplifier gain.

The circuit thus far described is essentially a well-known averaging converter in which the active filter 128 is a complex circuit which provides considerably superior filtering characteristics compared to a simple capacitive filter, which its impedance resembles. Thus, capacitor 132 can electrically balance filter 128. Amplifier 126 is provided so that filter 128 can function without being influenced by an output load.

This prior art circuit has high utility in a number of applications. It can be modified in accordance with the principles of the present invention even accepting the constraint that the original circuit should remain intact. As can be seen, this is accomplished by adding a first auxiliary operational rectifier (formed of amplifier 60, input resistor 78, and feedback paths of resistor 64-diode 62 and resistor 68-diode 66) and second auxiliary operational rectifier (formed of amplifier 92, input resistor 104, and feedback paths resistor 98-diode 96 and resistor 102-diode 100). A half-wave rectified output is fed from the junction of diode 36 and resistor 38 to summing input 70 of the first auxiliary rectifier through resistor 76 and to summing input 94 of the second auxiliary rectifier through resistor 108. The other half-wave rectified output is fed from the junction of diode 32 and resistor 34 through balance resistor 118 to ground. The essentially steady-state output signal from output terminal 138 to buffer 126 is fed back via resistor 74 to summing junction 70 and via resistor 106 to summing junction 94. Clearly, these two auxiliary operation rectifiers then provide clipping level DC outputs in substantially the same manner as their counter parts in the embodiment of FIG. 2.

These clipping level DC outputs are fed respectively through resistors 80 and 110 to summing junction 86 of an operational amplifier comprising amplifier stage 82 with a negative feedback loop through resistor 84. The output of amplifier 82 is inverted in an inverter comprising inverting amplifier stage 140 having input resistor 142 and feedback resistor 144. The output of inverter amplifier 140 is then fed through resistor 146 and summed at the summing input of amplifier 126 with the filtered output from the first operational rectifier. The output of amplifier 86 is also fed through resistor 148 back to the junction of resistor 122 and capacitor 132 in order to maintain desired electrical balancing.

It will be apparent that the device functions by generating incremental voltages determined by the clipping levels set by the choice of scaling resistors such as resistors 106 and 74, and summing these increments with the ordinary average of the input, thereby to produce a DC which approximates the desired value according to the selection of the series of incremental voltages.

Referring again to Equation 1, it should be again noted that the function G is proportional to $e_1(t)$ which itself is a function. Thus, when G is constructed as described as a limited piecewise linear approximation, there will be some error compared with the mathematically exact desired result. Then, with respect to some specific function $e_1(t)$ (such as sine, sine with known harmonics, square wave, etc.), the slopes and breakpoints of the approximating function can be modified so that the average or integral of $e_1$ (i.e., $e_0$ as shown in FIG. 1) provides the best result. And surprisingly, when values are selected as compromises then the results are still better than those of the prior art. For example, the two-clipping level version as shown in either FIG. 2 or 4 results in great improvement in harmonic effect rejection using the values of 0.6099 for $\alpha$, 1.732 for $\beta_1$, and 1.0 for $\beta_2$, as noted previously. In such case, if 3% third harmonic is present in an input sinusoid, an averaging AC to DC converter of the prior art will provide a worst case error or about 1% in the output DC. The RMS-proportional DC provided by an embodiment of the present invention with the noted values for $k_1$ and $k_2$ reduces this worst case error to about 0.05%. As noted this can be improved even more by computing for one or more selected input functions (here a sinusoid and a square wave) the required approximating function by looking at the results in the integral plane, i.e., refining the values of $k_1$ and $k_2$ for the specific waves. Thus if one employs as values the following: $\alpha=0.603$, $\beta_1=1.732$ and $\beta_2=1.439$ with $\varphi_1$ and $\varphi_2$ remaining at $\pi/6$ and $\pi/3$ respectively, to provide a converter which gives a compromise RMS output for either sinusoid or square wave inputs, one obtains the following results. For a pure sine wave input, there is essentially a zero error, and a similar zero error for a pure square wave input. For a sine wave with 3% third harmonic, for example, the RMS output worst case error is about 0.25%, a substantial improvement over the prior art. A triangular wave input in this case will also provide a worst case error less than that for the sine wave with 3% third harmonic.

Other compromises for sine-square waves, or other combinations of wave forms may be made by calculating in the integral or average plane as described above, changing $\varphi_1$ and $\varphi_2$ if necessary as well to achieve the optimum results desired. These results are given sensitivities for specific odd harmonics in sine wave applications, plus errors below selected magnitudes for the other input wave forms or signals.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A system for converting an electrical input signal into a substantially steady-state output signal, and comprising in combination:

means for providing the absolute value of said input signal, means for providing a plurality of other signals each determined in a selected proportion to the magnitude of said output signal, means for producing a plurality of intermediate signals each determined as the difference between a selected proportion of the magnitude of the absolute value of said input signal and the magnitude of a corresponding one of said other signals, means for summing said intermediate signals in predetermined proportion with one another to provide a sum; and means for averaging said sum to provide said output signal.

2. A system for converting an electrical input signal into substantially steady-state output signal and comprising in combination:

means for producing a plurality of auxiliary signals having respective amplitudes proportional to that portion of the absolute value of said input signal lying to one side of corresponding levels, said levels being determinde as respective selected proportions of the magnitude of said output signal in accordance with feedback of said output signal;

means for summing respectively selected proportions of each said auxiliary signals; and means for averaging the sum of said proportions of said auxiliary signals to obtain said output signal.

3. A system for converting an electrical input signal into a substantially steady-state output signal, and comprising in combination:

means for producing a first signal representative of the absolute value of said input signal;

first means for summing a first selected proportion of said ouput signal with a first selected proportion of said first signal so as to provide a second signal representative of the value of said first selected proportion of said first signal lying to one side of the value of said first selected proportion of said output signal;

second means for summing a second selected proportion of said output signal with a second selected proportion of said first signal so as to provide a third signal representative of the value of said second selected proportion of said first signal lying to one side of the value of said second selected proportion of said output signal;

means for summing respectively selected proportions of both said second and third signals to provide a resulting sum; and means for averaging said resulting sum to obtain said output signal.

4. A system for converting an electrical input signal into a substantially steady-state output signal and comprising in combination means for producing a second signal having an amplitude proportional to that portion of said input signal lying to one side of a first level, said first level being determined in selected proportion to the magnitude of said output signal;

means for producing a third signal having an amplitude proportional to that portion of said input signal lying to one side of a second level, said second level being determined as a selected proportion of the magnitude of said output signal;

means for summing respectively selected proportions of said second and third signals; and means for averaging the sum of said proportions of said second and third signals to obtain said output signal.

5. A system as defined in claim 4 wherein said input signal is an absolute valued signal.

6. A system for converting an electrical input signal into a substantially steady-state input signal, and comprising in combination a plurality of rectifiers having their inputs connected in parallel to the source of said input signal, means for summing and averaging multiples of the signal outputs of said rectifiers to produce said output signal, and feedback means connected for applying said output signal to at least two of said rectifiers so as to limit conduction for each of said rectifiers to amplitudes lying to one side of a respective level selected proportionally to said output signal.

7. A system as defined in claim 6 wherein said rectifiers are operational rectifiers.

8. A system as defined in claim 6 wherein there are two of said rectifiers to which said feedback means are connected, one of said levels being substantially one fraction of said output signal, the other of said levels being substantially another fraction of said output signal.

9. A system as defined in claim 8 wherein said one fraction is $\sqrt{2}/2$ and said another fraction is $\sqrt{6}/2$.

10. A system as defined in claim 6 wherein there are three of said rectifiers to which said feedback means are connected, one of said levels being substantially a first proportional factor times the amplitude of said output signal, a second of said levels being substantially a second proportional factor times said amplitude and the third of said levels being substantially a third proportional factor times said amplitude.

11. A system as defined in claim 10 wherein said first proportional factor is about $0.3827\sqrt{2}$;

said second proportional factor is about unity; and said third proportional factor is about $0.9239\sqrt{2}$.

12. A system as defined in claim 2 wherein said levels and said selected proportions of said auxiliary signals are selected such that said output signal is proportional to substantially the RMS value of said input signal.

13. A system as defined in claim 2 wherein said levels and said selected proportions of said auxiliary signals are selected such that said input signal is proportional to substantially the RMS value of said input signal where the latter includes either a square or a sine wave or both.

14. A system as defined in claim 12 wherein said levels and said selected proportions of said auxiliary signals are selected in view of the nature of the wave-form of the input signal so as to minimize the relative error in said output signal from a true RMS value.

15. A system as defined in claim 2 wherein said input signal has periodic wave-form and said levels are selected such that said output signal is proportional to substantially the RMS value of said input signal and is substantially insensitive at least to components of said wave-form which are the first four of the odd harmonics of the fundamental of said wave-form.

16. A system as defined in claim 5 including an absoluting means for providing said absolute-valued signal; and wherein said means for producing said second signal comprises a first operational rectifier having its input summing junction connected through first scaling impedance means to the output of said absoluting means, and through second scaling impedance means to the output of said system;

wherein said means for producing said third signal comprises a second operational rectifier having its input summing junction connected through third scaling impedance means to the output of said absoluting means, and through fourth scaling impedance means to the output of said system; and wherein said means for summing comprises an operational summing amplifier having its input summing junction connected through fifth scaling impedance means to the output of said first rectifier and through sixth scaling impedance means to the output of said second rectifier.

17. A system as defined in claim 16 wherein said impedance means are selected in view of the wave-form of said input signal so as to minimize the deviation of said output signal from the true RMS value of said input signal.

18. A system for converting an electrical input signal into a substantially steady-state output signal and comprising in combination;

an averaging converter comprising an operational rectifier having a high gain inverting amplification stage with two feedback paths between its output and input, one of said paths having a series impedance and a diode poled for conduction in one direction, the other of said paths having a series impedance and a diode poled for conduction in the opposite direction, a buffer means, a lead impedance connected between an input of said buffer means and the diode-impedance junction in one of said feedback paths, an input impedance connected between the input of said stage and a source of said input signal, a bypass impedance connected between said source and said input of said buffer means, and an active filter connected between said input of said buffer means and system ground, a first auxiliary operational rectifier having its summing junction connected through appropriate scaling resistors to the junction of the diode and impedance in said other feedback path, to said source and to the output of said buffer means;

a second auxiliary operational rectifier having its summing junction connected through appropriate scaling resistors to the junction of the diode and impedance in said other feedback path, to said source and to the output of said buffer means;

means for summing scaled outputs of said auxiliary operational rectifiers and for applying the resulting sum to said input of said buffer means.

19. A system for converting an electrical input signal into a substantially steady-state output signal and comprising in combination:

means for producing a first signal representative of the absolute value of the amplitude of said input signal;

circuit means having an input terminal and an output terminal and characterized by having a gain substantially directly proportional to the absolute value of amplitude of said output signal and substantially inversely proportional to the amplitude of said output signal, said input terminal being connected to said means for producing said first signal; and means for averaging the signal appearing at said output terminal.

20. A system as defined in claim 19 wherein said circuit means comprises means for providing a second signal representative of the squared value of said first signal, and means for dividing the amplitude of said second signal by the value of the amplitude of said output signal so as to provide said signal appearing at said output terminal.

21. A system as defined in claim 19 wherein said gain is approximated by summation of a plurality of intermediate signals each determined as the difference between a selected proportion of the amplitude of said first signal and the magnitude of a selected proportion of said output signal.

References Cited

UNITED STATES PATENTS

| | | | |
|---|---|---|---|
| 3,112,449 | 11/1963 | Miller | 328—26 |
| 3,196,291 | 7/1965 | Woodward, Jr. | 328—26X |
| 3,246,247 | 4/1966 | Grindle | 307—229X |
| 3,381,203 | 4/1968 | Mitchell | 321—47X |
| 3,419,787 | 12/1968 | Baehre | 321—47X |
| 3,443,126 | 5/1969 | Meyer | 328—26X |
| 3,466,526 | 9/1969 | Cole | 321—47X |
| 3,470,445 | 9/1969 | Richman | 321—16X |
| 3,476,954 | 11/1969 | Wennik et al. | 307—229X |
| 3,480,794 | 11/1969 | Richman | 307—261X |
| 3,491,252 | 1/1970 | Petrohilos | 307—229X |

WILLIAM M. SHOOP, Jr., Primary Examiner

U.S. Cl. X.R.

307—229, 260; 321—6, 47; 328—26